(12) United States Patent
Sun

(10) Patent No.: US 11,319,156 B2
(45) Date of Patent: May 3, 2022

(54) SORTING MODULE AND CONVEYER APPARTUS COMPOSED THEREOF

(71) Applicant: SUZHOU SUXIANG ROBOT INTELLIGENT EQUIPMENT CO., LTD, Jiangsu (CN)

(72) Inventor: Lining Sun, Jiangsu (CN)

(73) Assignee: SUZHOU SUXIANG ROBOT INTELLIGENT EQUIPMENT CO., LTD, Jiangsu (CN)

( * ) Notice: Subject to any disclaimer, the term of this patent is extended or adjusted under 35 U.S.C. 154(b) by 0 days.

(21) Appl. No.: 17/422,264

(22) PCT Filed: Jan. 18, 2020

(86) PCT No.: PCT/CN2020/072895
§ 371 (c)(1),
(2) Date: Jul. 12, 2021

(87) PCT Pub. No.: WO2020/147850
PCT Pub. Date: Jul. 23, 2020

(65) Prior Publication Data
US 2022/0041377 A1 Feb. 10, 2022

(30) Foreign Application Priority Data

Jan. 20, 2019 (CN) .......................... 201910050764.4
Jan. 20, 2019 (CN) .......................... 201910050766.3
(Continued)

(51) Int. Cl.
*B65G 13/10* (2006.01)
*B65G 13/04* (2006.01)
(Continued)

(52) U.S. Cl.
CPC ............. *B65G 13/10* (2013.01); *B65G 47/46* (2013.01); *B65G 47/64* (2013.01)

(58) Field of Classification Search
CPC ......... B65G 13/04; B65G 13/10; B65G 47/64
(Continued)

(56) References Cited

U.S. PATENT DOCUMENTS 3,420,356 A * 1/1969 Degood ............... B65G 47/261
198/781.01
3,550,756 A 12/1970 Komylak
(Continued)

FOREIGN PATENT DOCUMENTS

CN 102431806 A 5/2012
CN 108082833 A 5/2018
DE 102010044239 A1 10/2011

*Primary Examiner* — Douglas A Hess
(74) *Attorney, Agent, or Firm* — Hudak, Shunk & Farine Co. LPA

(57) ABSTRACT

A sorting module including two groups of transportation rollers, the two groups of transportation rollers include at least one group of irregular rollers, the other group of transportation rollers are regular rollers or irregular rollers, each group of transportation rollers include at least one row of transportation rollers, each row of transportation rollers include at least one transportation roller; the rotation center lines of each row of transportation rollers are on one straight line, and the rotation center lines of the two groups of transportation rollers are generally perpendicular to each other. A conveying device including the sorting module is simple in structure and low cost.

10 Claims, 9 Drawing Sheets

(30) Foreign Application Priority Data

Jan. 20, 2019 (CN) .......................... 201910050767.8
Jan. 20, 2019 (CN) .......................... 201910050771.4

(51) Int. Cl.
*B65G 47/64* (2006.01)
*B65G 47/46* (2006.01)

(58) Field of Classification Search
USPC ............................................ 193/35 R, 35 C
See application file for complete search history.

(56) References Cited

U.S. PATENT DOCUMENTS

| | | | | |
|---|---|---|---|---|
| 3,854,576 A * | 12/1974 | Bowman | .............. | B65G 47/268 |
| | | | | 198/835 |
| 4,318,468 A * | 3/1982 | Bodewes | .............. | B65G 47/268 |
| | | | | 198/718 |
| 4,505,381 A * | 3/1985 | Major | .................. | B65G 47/261 |
| | | | | 198/781.02 |
| 4,878,578 A * | 11/1989 | Brouwer | .............. | B65G 47/268 |
| | | | | 524/77 |
| 5,653,325 A * | 8/1997 | Enomoto | .............. | B65G 13/10 |
| | | | | 193/36 |
| 6,073,747 A * | 6/2000 | Takino | .................. | B65G 13/10 |
| | | | | 198/370.09 |
| 6,494,312 B2 * | 12/2002 | Costanzo | .............. | B65G 17/08 |
| | | | | 198/779 |
| 7,137,505 B2 * | 11/2006 | Stebnicki | .............. | B65G 17/40 |
| | | | | 198/850 |
| 7,234,587 B2 * | 6/2007 | Fandella | .............. | B65G 17/32 |
| | | | | 193/35 A |
| 7,357,245 B2 * | 4/2008 | Lee | .................. | B65G 17/24 |
| | | | | 198/778 |
| 7,540,368 B2 * | 6/2009 | Weiser | .................. | B65G 17/40 |
| | | | | 198/370.09 |
| 7,971,701 B2 * | 7/2011 | Fourney | .............. | B65G 17/24 |
| | | | | 198/370.09 |
| 9,309,053 B2 * | 4/2016 | Lasher | .................... | B25H 1/02 |
| 10,858,198 B1 * | 12/2020 | Good | .................... | B65G 47/28 |
| 11,174,108 B1 * | 11/2021 | Skarlupka | .............. | B65G 15/32 |

* cited by examiner a b a b

SORTING MODULE AND CONVEYER APPARTUS COMPOSED THEREOF

FIELD OF THE INVENTION

The invention relates to a conveying device, which is mainly used for logistics sorting and object transportation on a production line.

BACKGROUND OF THE INVENTION

At present, due to increase in labor costs, it is of great significance to replace humans with machines. Among them, automatic conveying devices have become a research hotspot for domestic and foreign technical personnel. A prominent example can be found at: http://www.sohu.com/a/142945825_276499, http://blog.sina.com.cn/s/blog_70270cb10102wmm0.html, wherein the structure is complex, with high cost, and in operation, the energy consumption is high.

SUMMARY OF THE INVENTION

The present invention designs a conveying device, which is simple in structure, low cost, easy to disassemble, replaceable, and with high sorting efficiency. It can be used to make intelligent sorting systems or intelligent production lines.

The present invention is designed as follows: a sorting module including two groups of transportation rollers, the two groups of transportation rollers include at least one group of irregular rollers, each group of the irregular rollers include at least one row of the irregular rollers, the cross-section of the irregular roller perpendicular to a rotation center line of the irregular roller is non-circular or eccentric, and the non-circular cross-section is substantially an ellipse, a regular polygon or another shape; the other group of transportation rollers are regular rollers or irregular rollers, the cross-section of the regular roller perpendicular to a rotation center line of the regular roller is circular, and the rotation center line passes through the center of the cross-section; the regular rollers are cylindrical rollers; each group of transportation rollers include at least one row of transportation rollers, each row of transportation rollers include at least one transportation roller; the rotation center lines of each row of transportation rollers are on one straight line, and the rotation center lines of the two groups of transportation rollers are not parallel to each other; the two groups of transportation rollers are located at an upper end of the sorting module, roller axles of the two groups of transportation rollers are provided on a frame of the module via a roller axle support system; a conveying mechanism comprises a group of transportation rollers, roller axles, and the transportation rollers are regular rollers or irregular rollers, each group of transportation rollers include at least one row of transportation rollers, each row of transportation rollers include at least one transportation roller; the rotation center lines of each row of transportation rollers are on one straight line, the transportation rollers are located at the upper portion of the conveying mechanism, and the roller axles of the transportation rollers are provided on a transportation frame.

Each group of transportation rollers of the sorting module include at least two rows of transportation rollers, and in one group, the rotation center line of one row of transportation rollers is parallel to a rotation center line of another row of transportation rollers.

The rotation center lines of the two groups of transportation rollers of the sorting module are perpendicular to each other.

When the irregular rollers rotate, the highest point of a top of each irregular roller is higher than the lowest place of a top horizontal plane of another group of irregular rollers or the highest point of the regular rollers; when the irregular rollers do not rotate, the highest point of the top of the irregular roller is essentially located at the lowest place of the top horizontal plane of the irregular roller in rotation.

The sorting module further includes built-in driving unit, each group of transportation rollers has a driving unit, and one driving unit drives one or more rows of transportation rollers in one group.

The sorting module may use an external driving unit to drive the sorting module, the external driving unit is provided on an external driving unit support and connected with a transmission mechanism of the module via a belt drive, a chain drive, a gear drive, or a friction drive.

The aforementioned sorting module can be used to make a conveying device. The conveying device includes a frame, a transportation channel, a sorting module, and a conveying mechanism, the transportation channel is provided on the frame, and at least one sorting module and at least one conveying mechanism are provided on an upper portion of the transportation channel.

The conveying mechanism includes a built-in driving unit, and one driving unit drives one or more rows of transportation rollers of the conveying device.

The conveying mechanism may use an external driving unit to drive the conveying mechanism. The external driving unit is provided on an external driving unit support and connected with a transmission mechanism of the conveying mechanism via a belt drive, a chain drive, a gear drive, or a friction drive.

The transportation channel includes a primary transportation channel and a secondary transportation channel, and the secondary transportation channel includes a first-level secondary transportation channel and $N^{th}$-level secondary transportation channel. The primary transportation channel and the first-level secondary transportation channel, the first-level secondary transportation channel and the second-level secondary transportation channel are perpendicular to each other, or on a straight line, or form an angle therebetween, and the angle is not a right angle.

The conveying device also includes a sorting inlet or outlet. The sorting inlet or outlet is located on the transportation channel. The sorting module is provided at the sorting inlet or outlet, or another place of the transportation channel. The length of the sorting module is equal to or greater than the width of the sorting inlet or outlet. The sorting module located in front of the sorting inlet or outlet can play a pre-sorting role. The width of the sorting module is not necessarily equal to the width of the transportation channel. One part is a conveying mechanism and the other part is the sorting module, or the conveying mechanism and the sorting module are arranged in an alternate manner, and the highest point of the rollers of the sorting module and the highest point of the adjacent rollers of the conveying mechanism are essentially located in the same horizontal plane, or with an upward or a downward step that does not affect the sorting and transportation of objects. The conveying direction of the conveying mechanism is essentially the same as the main driving direction or non-main driving direction of the sorting module.

Compared with the existing sorting and conveying devices, the conveying device provided by the present invention has the following advantages: it uses a combination of a plurality of transportation rollers, and is with a simple structure, flexible movement, can be driven by common DC motors, and is with low production cost; a wide range of goods can be sorted, and the sorting and transportation are smooth; the modular design facilitates replacement or reconstruction.

BRIEF DESCRIPTION OF THE DRAWINGS

FIG. 1 is a schematic structural diagram of an embodiment of the present invention, in which FIG. 1(a) is a top view and FIG. 2(b) is a cross-sectional view.

FIG. 3 shows the rotational positions of the two groups of transportation rollers of the sorting module of the present invention, in which FIG. 3(a) shows the regular roller and the irregular roller rotate, with the rotation center lines are in the same horizontal plane; FIG. 3(b) and FIG. 3(c) show two irregular rollers rotate, with the rotation center lines are in the same horizontal plane; FIG. 3(d) shows the regular roller and the irregular roller rotate, with the rotation center lines are not in the same horizontal plane.

FIG. 4 is a schematic structural diagram of an embodiment of the simplest sorting module, in which FIG. 2(a) is a top view, and FIG. 2(b) is a front view.

FIG. 6 shows top views of modular combinations of the embodiments of FIG. 2 and FIG. 3, in which FIG. 6(a) shows a modular combination of the embodiment of FIG. 2, and FIG. 6(b) shows the top view of modular combination of the embodiment of FIG. 3.

FIG. 7 is a schematic structural diagram of another embodiment of the sorting module of the present invention, in which FIG. 7(a) is a top view and FIG. 7(b) is a cross-sectional view.

FIG. 8 shows a top view of another embodiment of the simplest sorting module of the present invention and a top view of a modular combination thereof, in which FIG. 8(a) is a top view of another embodiment of the simplest sorting module, and FIG. 8(b) is a top view of the modular combination of another embodiment of the simplest sorting module.

FIG. 9 shows schematic structural diagrams of two embodiments of the conveying mechanism of the present invention, in which FIG. 9(a) is a schematic structural diagram of one embodiment, and FIG. 9(b) is a schematic structural diagram of another embodiment.

DETAILED DESCRIPTION OF THE INVENTION

Figure 1:
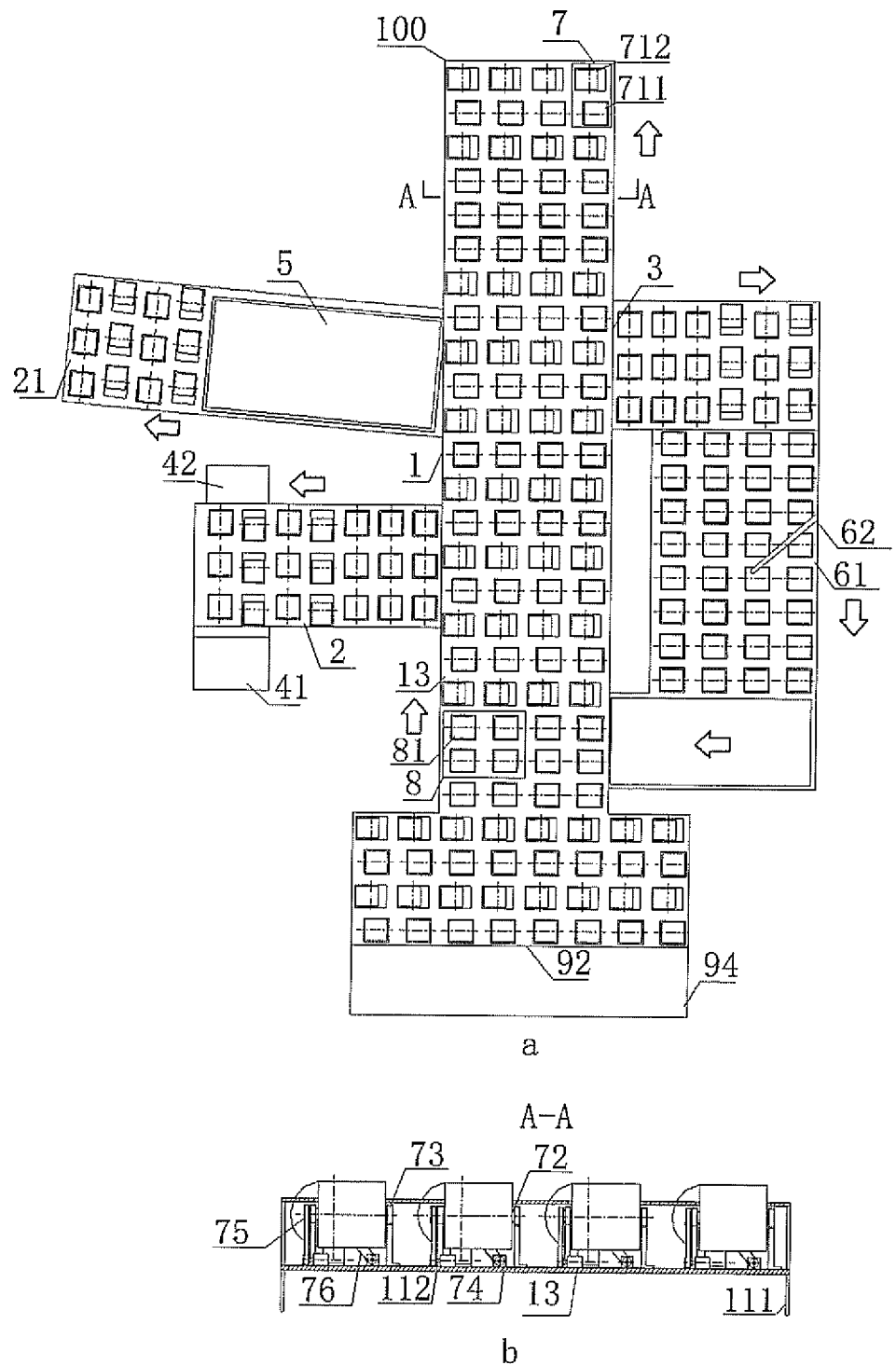

The conveying device mainly includes a frame 100, a transportation channel, a sorting outlet or inlet 3, a sorting module 7, and a conveying mechanism 8. As shown in FIG. 1, the transportation channel is provided on the frame 100, and the sorting outlet or inlet 3 is provided on the transportation channel. There is at least one sorting outlet or inlet 3. The transportation channel includes a primary transportation channel 2 and a secondary transportation channel, and the primary transportation channel is connected with the secondary transportation channel via the sorting outlet or inlet 3. The upper portion of the transportation channel is provided with at least one forting module 7 and at least one conveying mechanism 8. Where there is only one sorting module, it is considered as a sorting module of M rows×N rows. The sorting module 7 includes two groups of transportation rollers, and the two groups of transportation rollers include at least one group of irregular rollers 712. The cross-section of the irregular roller perpendicular to a rotation center line of the irregular roller is non-circular or eccentric, and the non-circular cross-section is substantially an ellipse, a regular polygon or another shape. The regular polygon may be rounded locally. The other group of transportation rollers are regular rollers 711 or irregular rollers 712. The cross-section of the regular roller perpendicular to a rotation center line of the irregular roller is circular, and the rotation center line passes through the center of the cross-section. The regular rollers 711 are cylindrical rollers. Each group of transportation rollers include at least one row of transportation rollers, each row of transportation rollers include at least one transportation roller; the rotation center lines of each row of transportation rollers are on one straight line, and the rotation center lines of the two groups of transportation rollers are not parallel to each other.

The two groups of transportation rollers of the sorting module 7 can be a group of regular rollers and a group of irregular rollers, or both of the two groups are irregular rollers, and each group of transportation rollers include at least one row of transportation rollers. The case can be a group of regular rollers and a group of irregular rollers and each group includes at least one row of transportation rollers, such as one row of regular rollers and one row of irregular rollers, two rows of regular rollers and one row of irregular rollers, one row of regular rollers and two rows of irregular rollers, N rows of regular rollers and N rows of irregular rollers (where N is greater than or equal to 2); or two groups of irregular rollers and each group includes at least one row of transportation rollers, such as two rows of irregular rollers, three rows of irregular rollers, and M rows of irregular rollers (where M is greater than 3). Each row of transportation rollers include at feast one transportation roller, such as each row of transportation rollers includes one transportation roller (the transportation roller is located at the center of the roller axle 72), two transportation rollers (the transportation rollers are located on both ends of the roller axle 72), or three or more transportation rollers (the transportation rollers are evenly distributed on the roller axle 72). When each group of transportation rollers include at least two rows of transportation rollers, the rotation center lines of all rows of transportation rollers are parallel to each other.

The two groups of transportation rollers of the sorting module 7 are located at the upper end of the sorting module 7. The rotation center lines of the two groups of transportation rollers may not be necessarily in the same plane. The rotation center lines of the two groups of transportation rollers can be in the same plane, or the rotation center lines of the two groups of transportation rollers are located in two different planes, but the rotation center lines of the same group of transportation rollers are located in the same plane.

Figure 2:
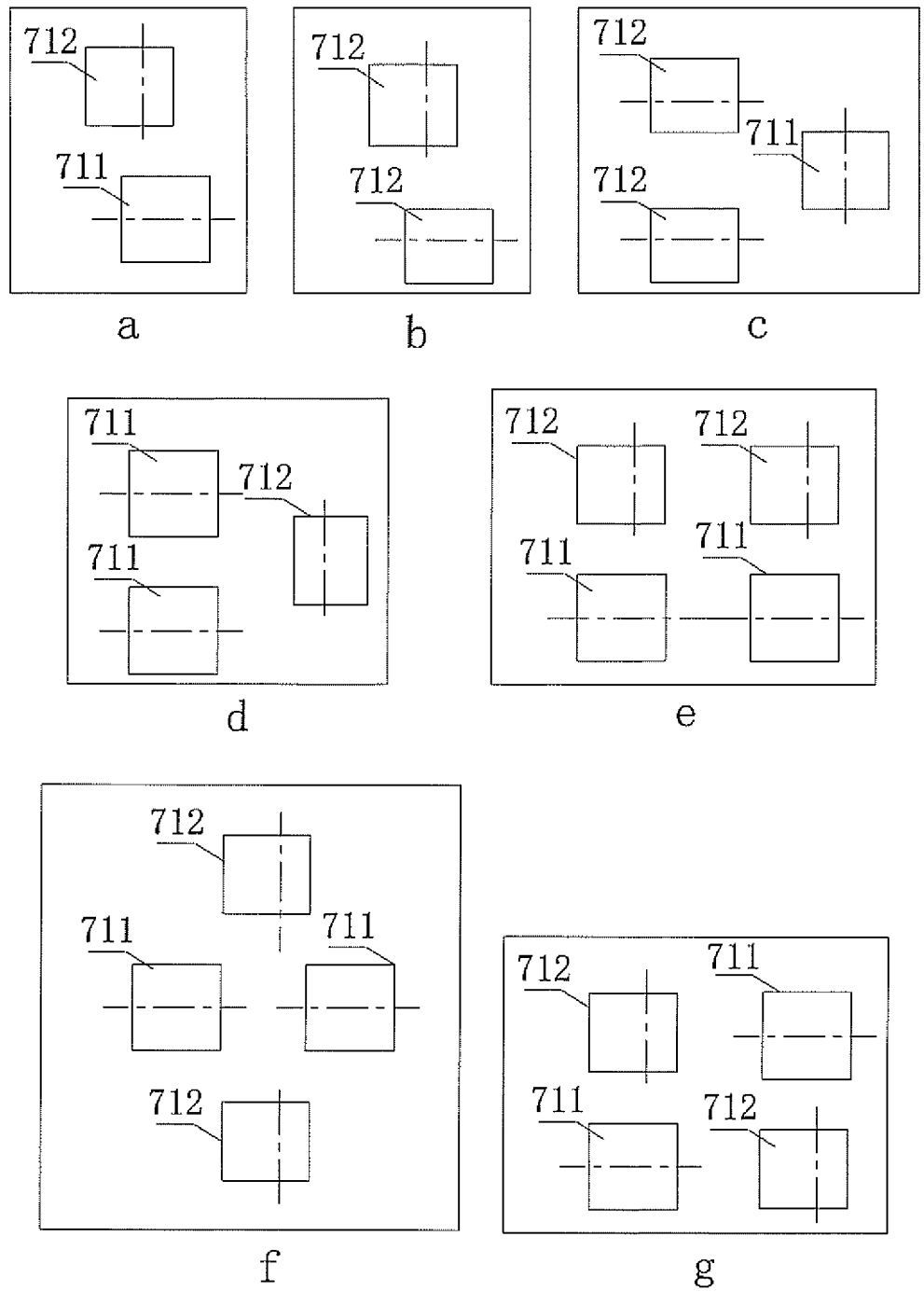
FIG. 2 is a view showing the arrangement of part of the two groups of transportation rollers of the sorting module of the present invention.

The number of rows of rollers included in the two groups of transportation rollers of the sorting module 7 can vary, and the relative positions of the rotation center lines of the two groups of transportation rollers can also vary. Accordingly, the two groups of transportation rollers in the sorting module 7 can be provided in many ways. The simplest sorting module 7 is that each group of transportation rollers include one row of transportation rollers, and one row of transportation rollers include one transportation roller. When the two groups of transportation rollers are projected to the same plane, the arrangement of the two groups of transportation rollers can be in the shape of "L", "T" or a shape obtained by rotating either of the above two shapes, as shown in FIGS. 2(a) and 2(b). In the case that one group of transportation rollers include two rows of transportation rollers, the other group of transportation rollers include one row of transportation rollers, and each row of transportation rollers include one transportation roller, and when the two groups of transportation rollers are projected to the same plane, the arrangement of the two groups of transportation rollers can be in the shape of "n" or the shape obtained by rotating "n", or the shape of "double T", as shown in FIGS. 2(c), 2(d) and 2(e). In the case that each group of transportation rollers include two rows of transportation rollers, each row of transportation rollers include one transportation roller, and when the two groups of transportation rollers are projected to the same plane, the arrangement of the two transportation rollers can be in the shape of a "cross" or "double T", as shown in FIGS. 2(f) and 2(g).

Figure 3:
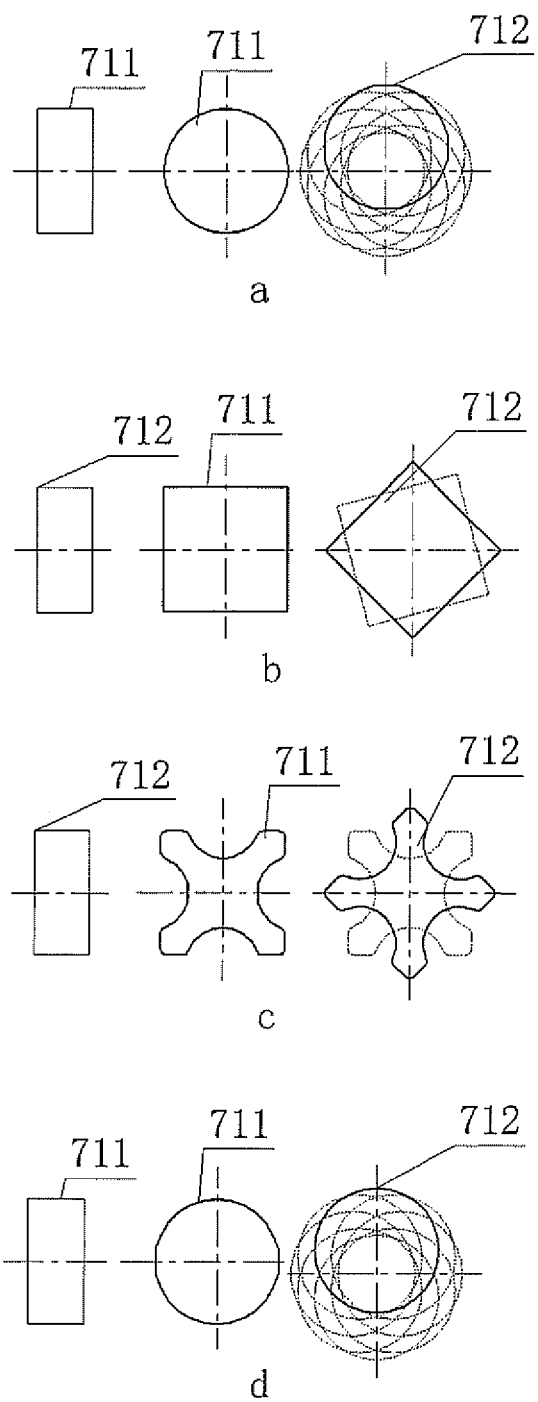

When the irregular rollers rotate, the highest point of a top of each irregular roller is higher than the lowest place of a top horizontal plane of another group of irregular rollers or the highest point of the regular rollers; when the irregular rollers do not rotate, the highest point of the top of the irregular roller is essentially located at the lowest place of the top horizontal plane of the irregular roller in rotation. When the irregular rollers rotate, the highest point of the top of the irregular roller is the case that the long radius is upward, and the lowest place of the top horizontal plane is the case that the short radius is upward. As shown in FIG. 3(a), when the regular roller and the irregular roller rotate, since the long radius of the irregular roller is greater than the radius of the regular roller, at certain positions, the irregular roller will lift up the object so that the irregular roller is higher than the regular roller to prevent the regular roller from becoming an obstacle to the movement of the object. The difference between the long radius of the irregular roller and the radius of the regular roller should be proper, i.e., not too big and not too small. When the difference is big, the regular roller will generally no longer be an obstacle to the movement of the object, and the object moves a longer distance when the irregular roller rotates for one round. When the difference is small, an uneven object or other items on the object may come into contact with the regular roller or be caught by the same, and the object moves a shorter distance when the irregular roller rotates for one round. Since the short radius of the irregular roller is shorter than the radius of the regular roller, when rotated to a certain position, the highest point of the irregular roller is lower than the highest point of the regular roller, and the irregular roller will no longer become an obstacle to the movement of the object, so that the conveyor belt or the regular roller can transport the object alone. When the regular roller and the irregular roller rotate, take the two groups of transportation rollers each rotating for at least one round as an example, there is at least a period of time that the highest point of the regular roller is higher than the highest point of the irregular roller, there is at least a period of time that the highest point of the regular roller is lower than the highest point of the irregular roller, and there are several time points that the highest points of the two groups of transportation rollers are at the same height. When the highest point of the regular roller is higher than the irregular roller, the irregular roller will no longer act on the object, and the regular roller will force the object to move. When the highest point of the regular roller is lower than the irregular roller, the object will be lifted up by the irregular roller, and the height of the bottom of the object will be increased, the regular roller will no longer act on the object, and the irregular roller will force the object to move.

Now referring to FIG. 3(b) and FIG. 3(c), when the two irregular rollers 712 rotate, both groups of irregular rollers 712 can lift up the object, making one group of irregular rollers 712 higher than the other group of irregular rollers 712, so as to prevent the other group of irregular rollers 712 from becoming an obstacle to the movement of the object. Both the difference between the long radius of one group of irregular rollers 712 and the short radius of the other group of irregular rollers 712 and the difference between the short radius of one group of irregular rollers and the long radius of the other group of irregular rollers should be proper, not too big nor too small. One group of irregular rollers drives the object to move. When the difference is big, the other group of irregular rollers will generally no longer be an obstacle to the movement of the object, and the object moves a longer distance when one group of irregular rollers rotate for one round. When the difference is small, an uneven object or other items on the object may come into contact with the other group of irregular rollers or be caught by the same, and the object moves a shorter distance when one group of irregular rollers rotates for one round. When the irregular rollers rotate, take the two groups of transportation rollers each rotating for at least one round as an example, there is at least a period of time that the highest point of one group of regular rollers is higher than the highest point of the other group of irregular rollers, there is at least a period of time that the highest point of one group of regular rollers is lower than the highest point of the other group of irregular rollers, and there are several time points that the highest points of the two groups of transportation rollers are at the same height, and the higher rollers have a driving effect on the object.

At least one group of the two groups of transportation rollers on the sorting module 7 are irregular rollers 712, and the other group of transportation rollers are regular rollers 711 or irregular rollers 712. When the object is being conveyed, the object is located on the two groups of transportation rollers, and the object is in contact with the transportation rollers, with the contacting surface of the object and the rollers being the transportation surface of the sorting module (the transportation surface is not necessarily a plane, but can also be a curved surface). The contacting surface of the object and the regular rollers is the transportation surface of the regular rollers of the sorting module. There is only one transportation surface for the regular rollers of the sorting module. The contacting surface of the object and the irregular rollers is the transportation surface of the irregular rollers of the sorting module. There are multiple transportation surfaces for the irregular rollers of the sorting module. The transportation surface for the irregular rollers moves up and down with rotation of the irregular rollers. When the transportation surface of the sorting module is a flat surface (the contact state between the object and the irregular roller is tangent, and the rotation axis of one group of irregular rollers are in the same plane), the vertical distance between the transportation surface for the regular rollers of the sorting module and the rotation center line of the regular rollers is equal to the radius of the regular roller; the maximum vertical distance between the transportation surface for the irregular rollers and the rotation center line of the irregular rollers is equal to the long radius of the irregular roller, and the minimum vertical distance therebetween is equal to the radius of the regular roller, and the portion of the irregular roller which is lower than the regular roller is not in contact with the object.

Now referring to FIG. 3(d), when the two groups of transportation rollers rotate, both groups of transportation rollers can lift up the object, making one group of transportation rollers higher than the other group of transportation rollers, so as to prevent the other group of transportation rollers from becoming an obstacle to the movement of the object. Take the two groups of transportation rollers each rotating for at least one round as an example, there is a period of time that the highest point of one group of transportation rollers is higher than the highest point of the other group of transportation rollers, there is a period of time that the highest point of one group of transportation rollers is lower than the highest point of the other group of transportation rollers, and there are several time points that the highest points of the two groups of transportation rollers are at the same height, and the higher transportation rollers have a driving effect on the object. In order to avoid interference, the rotation center lines of the two groups of transportation rollers may be arranged as not in the same plane. However, for reducing the production cost and easy operation, the height difference of the two rotation center lines should not be too big, and it is preferable that the two rotation center lines are arranged in the same plane, as long as they do not interfere with each other.

The edges of the two groups of transportation rollers of the sorting module 7 can be rounded, or the transportation rollers can be covered with a rubber skin, or knurls (rolled patterns) can be formed on the surface of the rollers to increase friction between the roller and the object.

The module support includes a roller axle support system 112 and a driving unit support system 113.

The sorting module 7 can have a built-in driving unit 74 (i.e., the sorting module 7 includes a driving unit), or an external driving unit (there is no driving unit in the sorting module 7, and the external driving unit is used to drive the two groups of transportation rollers of the sorting module 7). The sorting module 7 has at least two driving units, and each group of transportation rollers has its own driving units (at least one).

In the sorting module 7, the same row of transportation rollers of each group of transportation rollers are provided on the same roller axle, and the transportation rollers of different rows are provided on different roller axles, that is, each row of transportation rollers has a separate roller axle 72, and the sorting module includes at least two roller axles.

Figure 4:
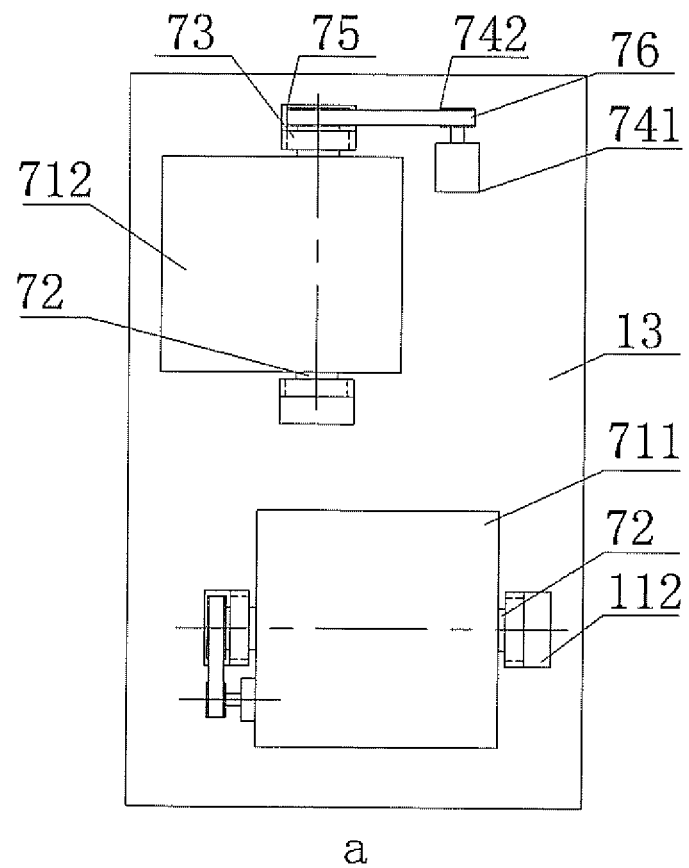
Figure 4:
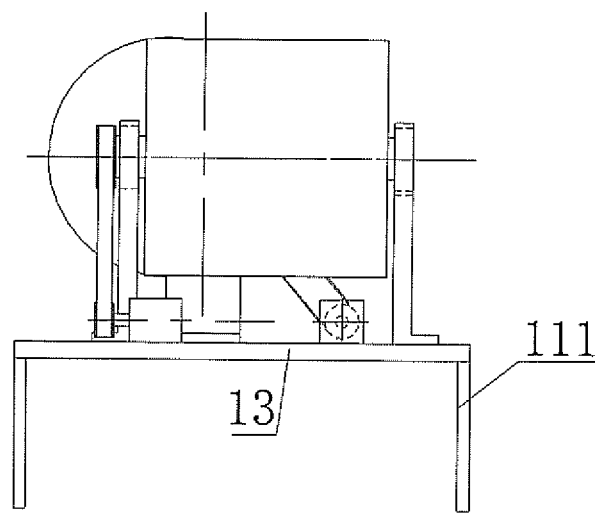
Figure 5:
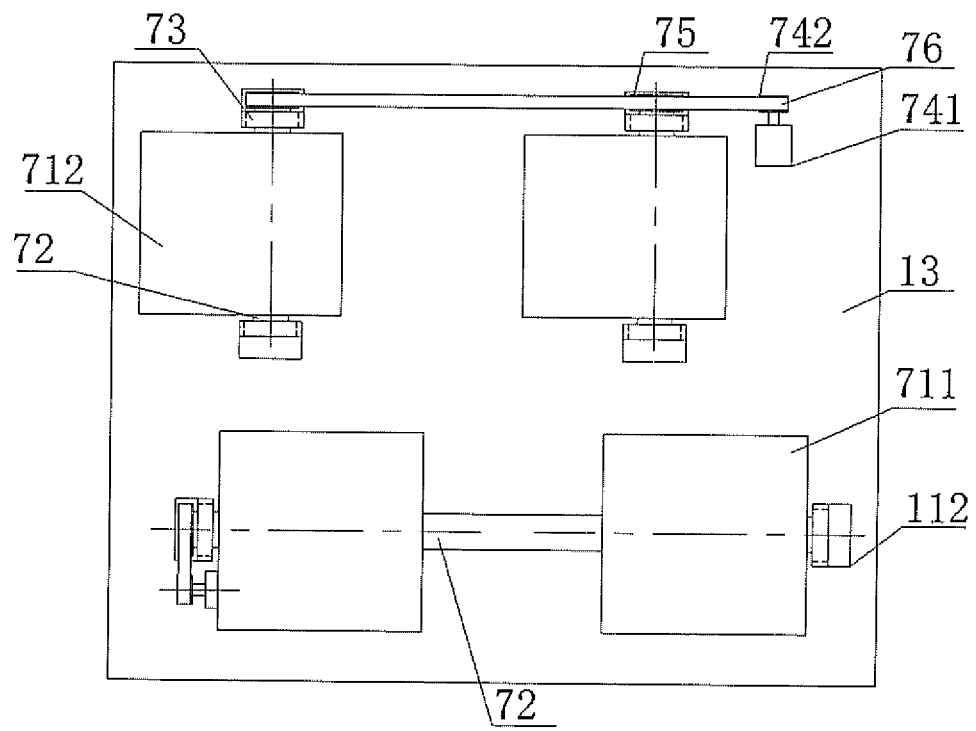
FIG. 5 is a top view of another embodiment of the sorting module of the present invention.

When the sorting module 7 includes a built-in driving unit 74, two groups of transportation rollers are respectively provided on different roller axles 72, and one row of transportation rollers are provided on one roller axle, and there are at least two roller axles, as shown in FIGS. 4 and 5. The roller axles can be provided on the roller axle support system 112 of the module frame through a bearing 73. The roller axle has a conveyor belt wheel or gear 75, and the built-in driving unit 74 can be connected with the conveyor belt wheel or gear 75 on the roller axle via a conveyor belt, a gear or a chain 76. The built-in driving unit 74 directly drives the roller axle to rotate and then drives a row of transportation rollers to rotate. The built-in driving unit 74 is located under the two groups of transportation rollers, or the roller axle can be connected to the built-in driving unit via a coupling. The rotation of the built-in driving unit drives the roller axle to rotate, and then the rotation of the roller axle drives a row of transportation rollers to rotate. The built-in driving unit is located at one end of the roller axle, or an intermediate transmission shaft (at least one) is added to the sorting module, and one intermediate transmission shaft is connected to a plurality of roller axles and a built-in driving unit 74 by a belt drive or a gear drive, among others. The built-in driving unit 74 drives the roller axle to rotate by driving the intermediate transmission shaft, and the rotation of the roller axle drives a row of transportation rollers to rotate. The built-in driving unit 74 is located under the two groups of transportation rollers, the built-in driving unit is provided on the driving unit support system 113 of the module frame.

When the sorting module 7 includes a built-in driving unit 74, the roller axles 72 can be provided directly on the roller axle support system 112 of the module frame. The two groups of transportation rollers are respectively provided on different bearings 73 or sleeves, and one row of transportation rollers are provided on a bearing 73 or a sleeve. The bearing 73 is provided on the roller axle 72, or the sleeve is provided on the roller axle 72 via a bearing 73. The number of the bearings 73 is at least two, or the number of the sleeves and the number of the bearings 73 each are at least two. At least two roller axles are provided, with each roller axle for a row of transportation rollers and at least one bearing 73. Each roller axle may also be arranged with at least one sleeve. The bearing 73 or the sleeve provided with roller axle thereon may also be provided with at least one gear or conveyor belt wheel 75. The gear or conveyor belt wheel 75 on the bearing 73 or the sleeve is connected to the built-in driving unit 74. The built-in driving unit 74 drives the gear to rotate and then drives a row of transportation rollers to rotate. Alternatively, an intermediate transmission shaft is added to the sorting module. The intermediate transmission shaft is connected to the gears or pulleys on a plurality of bearings 73 and a built-in driving unit by a belt transmission or a gear transmission, among others. The built-in driving unit drives the intermediate transmission shaft and then drives the gears or pulleys on the bearings 73 to rotate. The rotation of the gear or pulley drives a row of transportation rollers on the same bearing 73 to rotate. The built-in driving unit 74 is located under the two groups of transportation rollers, the built-in driving unit is provided on the driving unit support system 113 of the module frame.

When the sorting module 7 includes a built-in driving unit 74, the two groups of transportation rollers are directly provided respectively on the rotating shaft of a motor 741. One row of transportation rollers are provided on the same motor shaft. The motor is provided on the roller axle support system 112 of the module frame. The rotation of the motor drives the rollers to rotate.

When the sorting module 7 does not include a built-in driving unit, an external driving unit is required to drive the rollers to rotate, and it is connected with a transmission mechanism in the module by a belt transmission, a chain transmission, a gear transmission, or a friction transmission. Two groups of transportation rollers are fixed onto different roller axles 72. One row of transportation rollers is provided on one roller axle, and there are at least two roller axles. The roller axles are provided on the roller axle support system 112 of the module frame via bearings 73. The roller axle is provided with a conveyor belt wheel or a gear 75, or an intermediate transmission shaft is added to the sorting module. The intermediate transmission shaft is connected with a plurality of roller shafts by a belt drive or a gear drive, and the external driving unit drives the intermediate transmission shaft or the roller axles 72 to bring the rollers to move. Or the roller axles 72 are directly provided on the roller axle support system 112 of the module frame, and a row of transportation rollers are provided on a bearing 73 or a sleeve. The bearing 73 is provided on the roller axle 72 or the sleeve is provided on the roller axle via the bearing 73. There are at least two bearings 73, or there are at least two sleeves and at least two bearings 73. There are at least two roller axles, with each roller axle for a row of transportation rollers, at least one bearing 73. Each roller axle is also provided with at least one sleeve, the bearing 73 or the sleeve provided with rollers is further provided with at least on gear or conveyor belt wheel 75, or an intermediate transmission shaft is added to the sorting module, and the intermediate transmission shaft is connected to the gears or pulleys provided on a plurality of bearings or sleeves and a driving unit by a belt transmission or a gear transmission, among others. The external driving unit drives the roller to move by driving the intermediate transmission shaft or the gear on the bearing. The external driving unit is provided on an external driving unit support, and the external driving unit support is provided on the module frame or outside thereof.

For the two groups of transportation rollers, one row of transportation rollers may also be provided on a plurality of roller axles 72, and each roller axle 72 has a separate driving unit or a plurality of roller axles share one driving unit. In order to ensure synchronous rotation of the rollers, generally, a plurality of transportation rollers share one driving unit. In order to make the structure simple and operable, generally, a row of transportation rollers are provided on one roller axle 72, and different rows of transportation rollers are provided on different roller axles 72. For achieving certain functions, it is possible that one row of transportation rollers are provided on multiple roller axles 72.

The built-in driving unit 74 or the external driving unit of the sorting module 7 is a commonly used means such as a motor drive, a pneumatic drive or a hydraulic drive. There are also many transmission methods for driving the two groups of transportation rollers, including a gear transmission, a belt transmission, a chain transmission, or a worm and gear transmission, or other commonly used transmission methods. Depending on different transmission methods, different components, such as motors, pulleys, gears, worm gears and worms may be provided. When a belt transmission is used, a tensioning mechanism may be provided on the conveyor belt to relieve slipping of the conveyor belt during transmission. The built-in driving unit 74 may include a motor 741 and a pulley 742.

Most preferably, the sorting module 7 includes two groups of transportation rollers, with one group being irregular rollers 712, and the other group are regular rollers 711 or irregular rollers 712. Each group of transportation rollers include a row of transportation rollers, and each row of transportation rollers include a transportation roller. The rotation center lines of the two rows of transportation rollers are not necessarily in the same plane. The rotation center lines of the two rows of transportation rollers may be perpendicular to each other, and each row of transportation rollers are provided on one roller axle. A row of transportation rollers may be provided on a roller axle 72, and the roller axle 72 is provided on the roller axle support system 112 of the module frame via the bearing 73. The roller axle 72 is also provided with a transmission mechanism such as a pulley or gear, which is connected with a driving unit by a conveyor belt, a gear, or a transmission chain. The driving unit is a built-in driving unit 74 or an external driving unit. The built-in driving unit 74 is provided on the module frame via the driving unit support system 113. The built-in driving unit is a commonly used driving unit, such as a motor drive or a pneumatic drive. The external driving unit is provided on an external driving unit support. The external driving unit support is provided on the module frame or is provided outside thereof. The external driving unit is connected with a transmission mechanism in the module by a belt drive, a chain drive, a gear drive, or a friction drive. The driving unit is generally a motor drive, which is connected to a power supply system via a driving circuit. Generally, the driving unit is connected with the driving circuit via a spring piece or a connector.

When the transportation rollers are irregular rollers, the irregular rollers of the same group are driven by one driving unit or driven by different driving units. When they are driven by the same driving unit, the states of installation of the same group of irregular rollers in the sorting module 7 should be the same (the orientations and positions of the short radius and long radius of the irregular rollers relative to the rotation center line of the irregular rollers should be the same) to ensure that the contact states of the irregular rollers in the same group with the object are the same when the object is driven to move, and prevent some of the rollers from becoming too high and causing the object to be unstable or becoming an obstacle to the movement of the object. Generally, the short radius of the irregular roller is upward (if the long radius is upward, when the other group of rollers are regular rollers, it will become an obstacle to the transportation of the regular rollers). When they are not driven by the same driving unit, the states of installation in the sorting module 7 and the moving speeds of the irregular rollers of the group should be as same as possible to prevent some rollers from becoming too high during the rotation and causing the object to run unstably or becoming an obstacle to the movement of the object.

The sorting module 7 may also be provided with some supporting universal balls to increase stability of the objects during transportation and sorting. Since there are various forms for the two groups of transportation rollers, the positions of the universal balls are also variable. In most cases, the universal balls are provided in the spaces between rollers, and the distances from a universal ball to the two or four rollers are equal.

Figure 6:
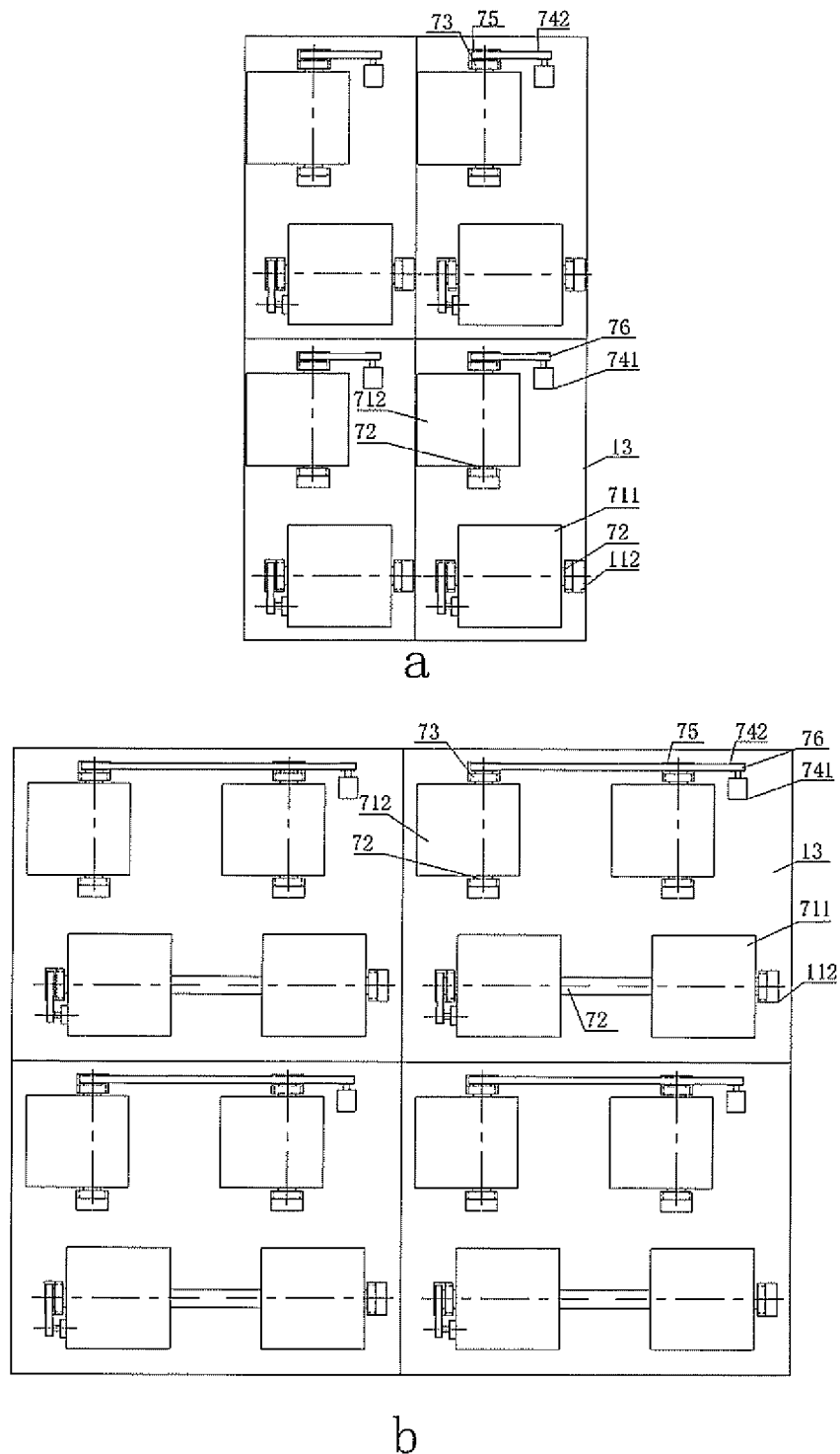

When the number of the two groups of transportation rollers of a sorting module is small, in order to ensure stability of the sorting module, the sorting module is designed as a whole. When the sorting module is large, that is, when the number of the two groups of transportation rollers included in the sorting module is large, the sorting module is formed of a plurality of small sorting modules, and each of the small sorting modules can carry out a sorting independently, as shown in FIG. 6. The small sorting module has its own built-in driving unit, or multiple small sorting modules share one built-in driving unit, or use an external driving unit to drive them. This modular design facilitates the transportation, assembly and replacement of the sorting modules. When the modules are small, the cost is lower. A factory or an express company can store one or more small sorting modules, and when one of the small sorting modules fails, it can be replaced timely. This is convenient and fast, and will not affect the operation, thereby avoiding problems associated with a large module, such as failure, which would affect the working efficiency. The highest points of adjacent two groups of rollers located in different small sorting modules are in the same horizontal plane, or there is an upward or a downward step, which is small and will not affect normal sorting and transportation of objects.

The width and number of the two groups of transportation rollers in the sorting module 7 and the spacing between the rollers are determined according to the objects to be conveyed. When the objects to be conveyed are large but light, the required driving force of the rollers is small. In order to reduce the weight of the transportation rollers, The spacing between the rollers may be increased, the number of rollers may be decreased, and the width of the rollers may also be decreased, or the rollers may be simplified.

Part of the roller can be removed. However, simplification of the roller is not limited thereto, as long as the purpose of simplification can be achieved without affecting the normal operation of the roller.

Figure 8:
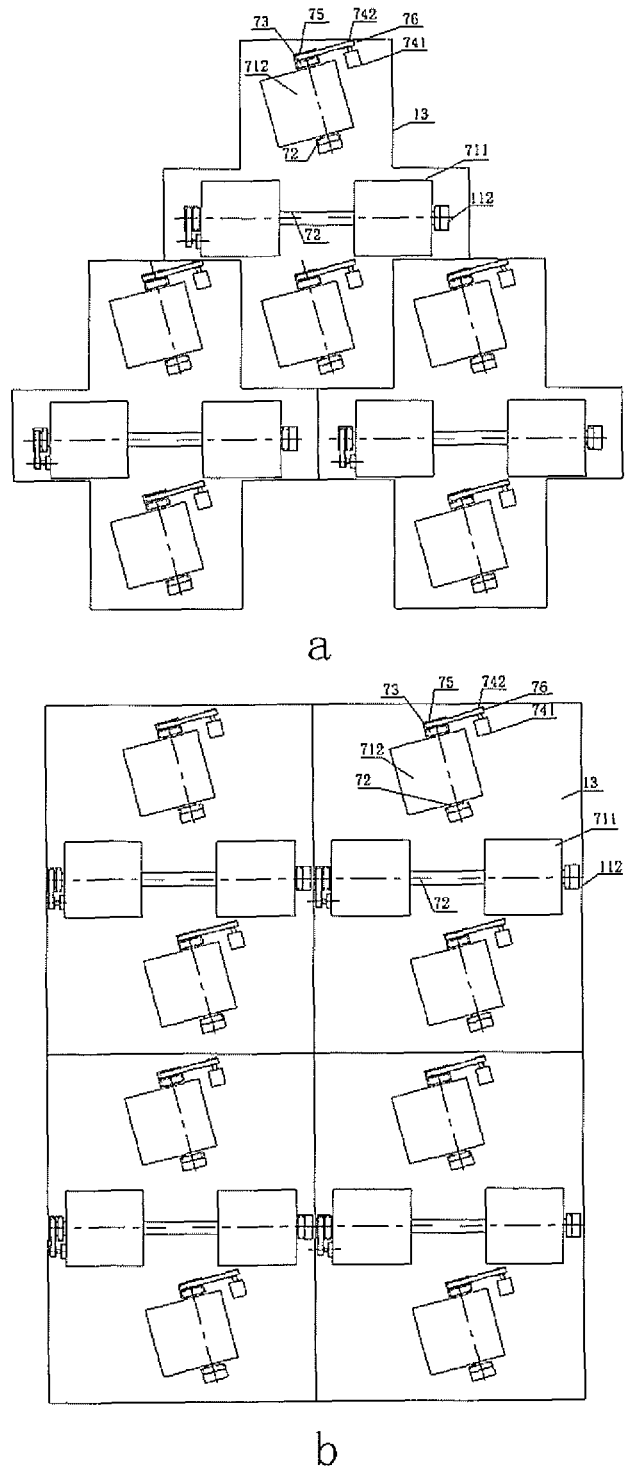

On the sorting module 7, the direction parallel to the positive direction of the sorting module 7 (the arrow head points to the positive direction, and the arrow tail points to the negative direction; where positive direction or negative direction is mentioned, it is arrow head direction or arrow tail direction) is the main driving direction of the sorting module, and the direction that is not parallel to the positive direction of the sorting module 7 is the non-main driving direction of the sorting module. The rollers that drive the object to move in the main driving direction is the main driving rollers of the sorting module, and the rollers that drive the object in the non-main driving direction is the non-main driving rollers of the sorting module. Both the main driving rollers and the non-main driving rollers can be regular rollers or irregular rollers. The movement direction of the object is between the main driving direction and the non-main driving direction. The rotation center lines of the main driving rollers are perpendicular to the main driving direction, and the rotation center lines of the non-main driving rollers are not perpendicular to the main driving direction. When other conditions are kept unchanged, the moving direction of the object can be adjusted by changing the direction of the rotation center line of the non-main driving rollers, and this can improve the sorting efficiency, as shown in FIG. 8.

The module frame may further include an upper plate 112, or a lower plate 113, or both. When the upper and lower plates exist, the module frame includes a supporting system for the upper and lower plates.

When an upper plate 112 or a lower plate 113 exists, the two groups of transportation rollers and the built-in driving unit 74 can be provided on the upper plate 112 or the lower plate 113. During rotation of the two groups of transportation rollers, part of the two groups of transportation rollers or an upper portion thereof (an upper portion of the transportation rollers or the part above the roller axles) can extend above the upper surface of the upper plate. The roller axles are generally provided under the upper plate and against the lower surface of the upper plate (to prevent debris of the object on the conveyor belt from being caught in the gap between the roller axles and the surface). The upper plate can also be used to support the weight of the object being transported and protect the two groups of transportation rollers and the roller axles thereof.

At least one detecting means is provided in the sorting module 7 for detecting the stopped state of the irregular rollers. In the case that the rollers in the main driving direction are regular rollers, and the rollers in the non-main driving direction are irregular rollers, when the irregular rollers stop, the short radius must be upward (if the long radius is upward, they will become an obstacle to the transportation of the regular rollers). The transmission shaft of the irregular roller or the shaft of an electric motor (or a hydraulic or pneumatic motor) or the rotation axle of the irregular roller may be provided with a transparent optical code disc (a grating encoder or a photoelectric encoder), or a reflective code disc is provided on a side surface of the irregular roller, or Hall components or another position sensor can be used to detect the stopped position of the irregular roller; or a Geneva mechanism can also be used to drive the irregular roller so that the irregular roller can be stopped at a fixed position. Alternatively, one state of the irregular roller can be set as the initial state of the module, and when the stopped state of the irregular roller is detected to be inconsistent with the initial state, the driving unit will be started immediately to move the irregular roller to the initial state, or one state of an irregular roller is temporarily set as a target state, and when another roller in the group is inconsistent with the target state, the driving motor will bring the roller to move to the target state to ensure that the rollers in the group are in the same state. If the deceleration of the driving unit is small, a weight can be provided on the extension line of the short radius of the irregular roller passing through the center of the rotation axis, and the inertia of the roller can be applied to adjust the roller to the state that the short radius is upward.

Figure 9:
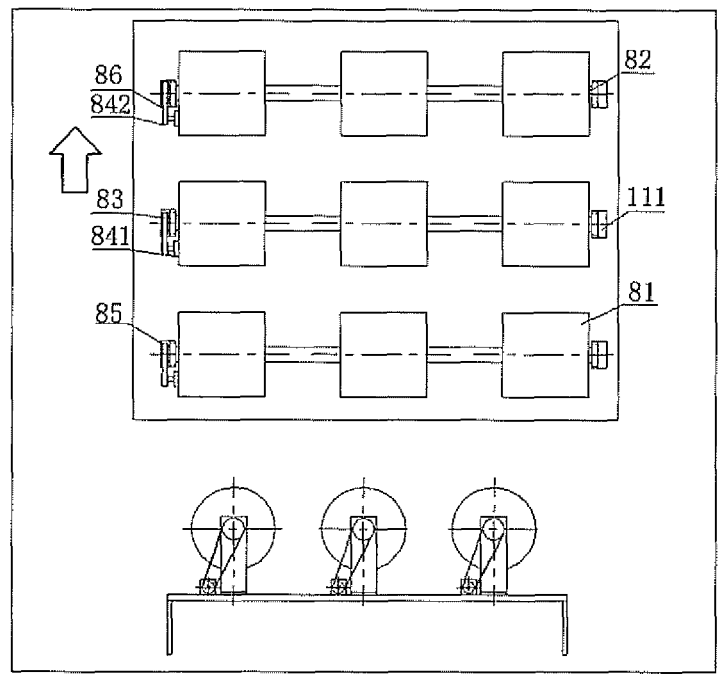
Figure 9:
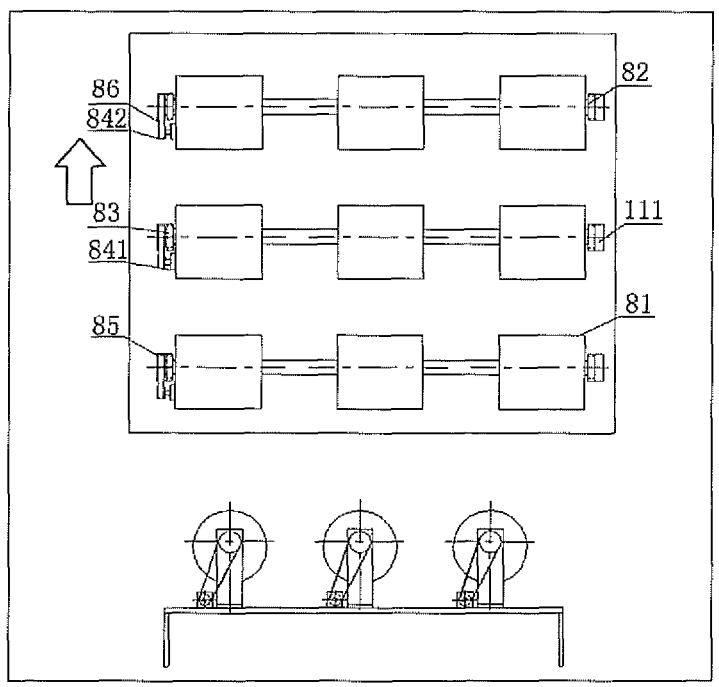

The conveying device may also include a conveying mechanism 8. As shown in FIG. 9, there is at least one conveying mechanism 8. The conveying mechanism 8 includes a group of transportation rollers 81, roller axles 82, and bearings 83. The transportation rollers 81 may be regular rollers or irregular rollers. The transportation rollers 81 include at least one row of transportation rollers, and each row of transportation rollers includes at least one transportation roller. The rotation center line of each row of transportation rollers is on a straight line, and the rotation center lines of all rows of transportation rollers are parallel to each other and in the same plane. The transportation rollers of each row are provided on the same roller axle 82, and one roller axle 82 is provided with only one row of transportation rollers.

The conveying mechanism 8 includes a conveying frame, and the conveying frame includes a roller axle support system and a driving unit support system.

The edges of transportation roller 31 can be rounded, or the transportation roller can be provided with a rubber skin, or knurls (a rolled pattern) can be formed on the surface of the roller to increase friction of the transportation roller against an object.

The conveying mechanism 8 can have a built-in driving unit (i.e., the conveying mechanism 8 includes a driving unit), or an external driving unit (there is no driving unit in the conveying mechanism 8, and an external driving unit is used to drive one group of transportation rollers of the conveying mechanism 8). The transportation rollers of the conveying mechanism 8 are driven by a built-in driving unit or an external driving unit. There is at least one driving unit.

When the conveying mechanism 8 includes a built-in driving unit, the rollers can be provided on a roller axle 82, and one row of transportation rollers is provided on one roller axle 82. The roller axle 82 can be provided on the roller axle support system 2 of the conveying frame through a bearing 83. The roller axle 82 has a conveyor pulley or gear 85, and the driving unit can be connected with the conveyor pulley or gear 85 on the roller axle via a conveyor belt, a gear or a chain 86. The built-in driving unit directly drives the roller axle to rotate and then drives a row of transportation rollers to rotate. The built-in driving unit is located under the rollers, or the roller axle can be connected to the built-in driving unit via a coupling. The rotation of the built-in driving unit drives the roller axle to rotate, and then the rotation of the roller axle drives a row of transportation rollers to rotate. The built-in driving unit is located at one end of the roller axle, or an intermediate transmission shaft is added to the conveying mechanism 8, and one intermediate transmission shaft is connected to a plurality of roller axles 82 and a built-in driving unit by a belt drive or a gear drive, among others. The built-in driving unit drives one or more roller axles to rotate by driving the intermediate transmission shaft, and the rotation of the roller axle 82 drives the rollers to rotate. The driving unit is located under the rollers, and the driving unit is provided on the driving unit support system 113 of the conveying frame.

When the conveying mechanism 8 includes a built-in driving unit, the roller axles 82 can be provided directly on the roller axle support system of the conveying frame. One row of transportation rollers are provided on a bearing 83 or a sleeve. The bearing 83 is provided on the roller axle 82, or the sleeve is provided on the roller axle 82 via a bearing 83. Each roller axle 82 is provided with a row of transportation rollers and one bearing 83, or each roller axle 82 is provided with a row of transportation rollers, one bearing 83 and one sleeve. The bearing 83 or the sleeve provided with roller axle thereon may also be provided with a gear or a conveyor pulley 85. The gear or conveyor pulley 85 on the bearing 83 or the sleeve is connected to the built-in driving unit. The built-in driving unit drives the gear to rotate and then drives a row of transportation rollers to rotate. Alternatively, an intermediate transmission shaft is added to the conveying mechanism 8. The intermediate transmission shaft is connected respectively to the gears or pulleys on a plurality of bearings 83 and a driving unit by a belt transmission or a gear transmission, among others. The driving unit drives the intermediate transmission shaft and then drives the gears or pulleys on the bearings 83 to rotate. The rotation of the gears or pulleys drives the transportation rollers on the same bearing 83 to rotate. The driving unit is located under the transportation rollers. The driving unit is provided on the driving unit support system of the conveying frame.

When the conveying mechanism 8 includes a built-in driving unit, a row of transportation rollers may also be directly provided on the rotating shaft of a motor. The motor is provided on the roller axle support system of the conveying frame. The rotation of the motor drives the roller to rotate.

When the conveying mechanism 8 does not include a built-in driving unit, an external driving units is required to drive the rollers to rotate, and it is connected with the transmission mechanism in the module by a belt transmission, a chain transmission, a gear transmission, or a friction transmission. The transportation rollers 81 are provided on the roller axles 82. Only one row of transportation rollers are provided on each of the roller axles 82. The roller axles 82 are provided on the roller axle support system of the conveying frame via bearings 83. The roller axle 82 is provided with a conveyor pulley or a gear 85, or an intermediate transmission shaft is added to the conveying mechanism 8. The intermediate transmission shaft is connected with a plurality of roller axles by a belt drive or a gear drive, and the external driving unit drives the intermediate transmission shaft or the roller axles to bring the rollers to move. Alternatively, the roller axles 82 are directly provided on the roller axle support system of the conveying frame, and a row of transportation rollers are provided on a bearing 83 or a sleeve. The bearing 83 is provided on the roller axle 82 or the sleeve is provided on the roller axle via the bearing 83. Each roller axle 82 is provided with one row of transportation rollers and one bearing 83, or each roller axle 82 is provided with a row of transportation rollers, one bearing 83 and one sleeve. The bearing 83 or the sleeve provided with rollers thereon may also be provided with at least one gear or a conveyor pulley 85, or an intermediate transmission shaft is added to the conveying mechanism 8, and one intermediate transmission shaft is connected to the gears or pulleys provided on a plurality of bearings 83 or sleeves and a driving unit by a belt transmission or a gear transmission, among others. The external driving unit can drive the roller to move by driving the intermediate transmission shaft or the gear on the bearing.

The built-in driving unit or the external driving unit of the conveying mechanism 8 is a commonly used one such as a motor drive, a pneumatic drive or a hydraulic drive. There are also many transmission methods for driving the two groups of transportation rollers, including a gear transmission, a belt transmission, a chain transmission, or a worm and gear transmission, or other commonly used transmission methods. Depending on different transmission methods, different components, such as motors, pulleys, gears, worm gears and worms may be provided. When a belt transmission is used, a tensioning mechanism may be provided on the conveyor belt to relieve slipping of the conveyor belt during transmission. The built-in driving unit may include a motor 841 and a pulley 842.

Generally, one row of transportation rollers are provided on one roller axle 82. One row of transportation rollers may also be provided on a plurality of roller axles 82, and each roller axle 72 may have a separate driving unit, or a plurality of roller axles share one driving unit. When the rollers are irregular rollers, the state of installation, rotation speed and state of being driven will affect the transportation of the object, which may result in different contacting states of the rollers with the object during rotation, and thus the object is not stable. In order to ensure synchronous rotation of the rollers, a plurality of transportation rollers that are installed on different roller axles share one driving unit, which increases the complexity of the structure and affects adversely the transportation of the object. In order to make the structure simple and operable, generally, a row of transportation rollers are provided on one roller axle 82, and different rows of transportation rollers are provided on different roller axles 82. For achieving certain functions, it is possible that one row of transportation rollers are provided on a plurality of roller axles 82.

When the number of the transportation rollers of the conveying mechanism 8 is small, in order to ensure stability of the conveying mechanism 8, the conveying mechanism 8 may be designed as a whole. When the conveying mechanism 8 is large, that is, when the number of the transportation rollers included in the conveying mechanism 8 is large, the conveying mechanism 8 may be formed of a plurality of small conveying mechanisms, and each of the small conveying mechanisms can carry out a conveying process independently. A small conveying mechanism may have its own driving unit, or a plurality of small conveying mechanisms share one driving unit, or use an external driving unit to drive them. This modular design facilitates the transportation, assembly and replacement of the conveying mechanism 8. When the modules are small, the cost is lower. A factory or an express company can store one or more small conveying mechanisms, and when one of the small conveying mechanisms fails, it can be replaced timely. This is convenient and fast, and will not affect the operation, thereby avoiding problems associated with a large module, such as failure. The highest points of adjacent rollers located in different small conveying mechanisms are in the same horizontal plane, or there is an upward or a downward step, which is small and will not affect normal sorting and transportation of objects.

One group of transportation rollers of the conveying mechanism 8 are regular rollers or irregular rollers. When the object is being conveyed, the object is located on the transportation rollers, and the object is in contact with the transportation rollers, with the contacting surface of the object and the rollers being the transportation surface of the conveying mechanism (the transportation surface is not necessarily a plane, but can also be a curved surface). The contacting surface of the object and the regular rollers is the transportation surface for the regular rollers of the conveying mechanism. There is only one transportation surface for the regular rollers of the conveying mechanism. The contacting surface of the object and the irregular rollers is the transportation surface for the irregular rollers of the conveying mechanism. There are multiple transportation surfaces for the irregular rollers of the conveying mechanism. The transportation surface for the irregular rollers moves up and down with the rotation of the irregular rollers. When the transportation surface is a flat surface (the contact state between the object and the transportation roller is tangent, and the rotation axis of the transportation rollers are in the same plane), the vertical distance between the transportation surface for the regular rollers and the rotation center line of the regular rollers is equal to the radius of the regular roller, and the maximum vertical distance between the transportation surface for the irregular rollers and the rotation center line of the irregular rollers is equal to the long radius of the irregular roller, and the minimum vertical distance therebetween is equal to the short radius of the irregular roller.

The conveying mechanism 8 can also be provided with some supporting universal balls to increase stability of the objects during transportation. A universal ball may be provided between two rollers, and the vertical distances from the universal ball to the rotation center lines of the two rollers are equal. Alternatively, a universal ball may be provided between four transportation rollers, and the distances from the universal ball to the centers of the four adjacent transportation rollers are equal. Since the rollers of the conveying mechanism 8 can be regular rollers or irregular rollers, the height of the universal balls can be set according to the type of the rollers. When the rollers are regular rollers, the highest point of the universal ball is generally flush with the highest point of the regular roller; when the rollers are irregular rollers, the highest point of the universal ball is generally flush with the short radius of the irregular roller.

On the conveying mechanism 8, the conveying direction of the conveying mechanism 8 is indicated in FIG. 9, with the arrow head pointing to the positive direction, and the arrow tail pointing to the negative direction. The rotation center line of the transportation rollers 81 is perpendicular to the conveying direction, and the transportation rollers 81 drive the object to move in the conveying direction of the conveying mechanism 8.

The conveying frame may further include an upper plate, or a lower plate, or both. When the upper and lower plates exist, the module frame may further include a supporting system for the upper and lower plates.

When an upper plate or a lower plate exists, the transportation rollers of the conveying mechanism 8 and the built-in driving unit thereof can be provided on the upper plate or the lower plate. During rotation of the rollers, part of the transportation rollers or an upper portion thereof (an upper portion of the transportation rollers or the part above the roller axles) can extend above the upper surface of the upper plate. The roller axles are generally provided under the upper plate and against the lower surface of the upper plate (to prevent debris of the object on the conveyor belt from being caught in the gap between the roller axles and the surface). The upper plate can also be used to support the weight of the object being transported and protect the transportation rollers 81 and the roller axles 82.

The external driving units of the sorting module 7 and the conveying mechanism 8 can be located on the sorting device, or not on the sorting device, and provided externally. The sorting device or an external driving unit is connected with the conveying structure of the sorting module 7 and the conveying mechanism 8. The driving unit of the sorting module 7 and the conveying mechanism 8 can be provided separately, or they can share the driving unit.

The sorting module 7 and the conveying mechanism 8 are provided at the upper portion of a transportation channel. The transportation direction of the transportation channel is the arrow head direction, as shown in FIG. 1. The object moves in the transportation direction. The sorting module 7 and the conveying mechanism 8 of one transportation channel may be provided in a line, or provided alternately in a parallel manner. The conveying direction of the conveying mechanism 8 is essentially the same as the main driving direction or non-main driving direction of the sorting module 7. The highest points of two adjacent groups of rollers that are provided respectively on the sorting module 7 and the conveying mechanism 8 are located in the same horizontal plane, or with an upward or a downward step that is small and does not affect the normal sorting and transportation of objects. The sorting module 7 and the conveying mechanism 8 may not include a module frame or a conveying frame. The sorting module 7 and the conveying mechanism 8 are provided on the frame 100. The frame 100 includes a support system, and the sorting module 7 and the conveying mechanism 8 are provided on the support system. The frame 100 may also include an upper plate and a lower plate. When an upper plate and lower plate exist, the upper plate may be provided at an upper portion of the transportation channel, and the lower plate may be provided at a lower portion of the transportation channel. The sorting module 7 and the conveying mechanism 8 may be provided on the upper plate or the lower plate. Part of the rollers or an upper portion of the rollers of the sorting module 7 and the conveying mechanism 8 (an upper portion of the rollers or the part above the roller axles) extend above the upper surface of the upper plate. The roller axles are generally provided under the upper plate and against the lower surface of the upper plate (to prevent debris of the object on the conveyor belt from being caught in the gap between the roller axles and the surface). The lower plate can be used to bear the weight of the sorting module 7 and the conveying mechanism 8. The upper plate can be used to support the weight of the object being transported and protect the rollers and the roller axles of the sorting module 7 and the conveying mechanism 8.

The transportation channel is provided on the frame 100, and the transportation channel includes a primary transportation channel 2 and a secondary transportation channel. A sorting outlet or inlet 3 is provided on the transportation channel and there is at least one sorting outlet or inlet 3. The sorting outlet or inlet 3 is located at one end or one side of the transportation channel and the primary transportation channel 2 is connected with the secondary transportation channel via the sorting outlet or inlet 3. The transportation channel further includes an outlet or inlet 92, the outlet or inlet 92 can be connected with another handling device for next step handling (at the outlet 92, a device for sorting, packing or stacking may be provided), or it is not connected with any device and just serve as an outlet or inlet of objects.

At least one sorting module 7 and at least one conveying mechanism 8 are provided on the primary transportation channel 2, wherein the rotation center line of a group of transportation rollers in the sorting module 7 is generally perpendicular to the primary transportation channel 2, the rotation center line of the other group of transportation rollers is not perpendicular to the primary transportation channel 2, and the rotation center line of the rollers of the conveying mechanism 8 is generally perpendicular to the primary transportation channel 2. The sorting module 7 and the conveying mechanism 8 can be alternately arranged.

On the primary transportation channel 2, the sorting outlet or inlet 3 is located on the transportation channel, and the sorting module 7 is provided at the sorting outlet or inlet 3 or another position of the transportation channel. The length of the sorting module 7 is equal to or greater than the width of the sorting outlet or inlet 3. The sorting module 7 that is located in front of the sorting outlet or inlet 3 plays the role of pre-sorting. The width of the sorting module 7 is not necessarily the same as the width of the transportation channel. One part can be the conveying mechanism 8 and the other part is the sorting module 7, or the conveying mechanism 8 and the sorting module 7 are arranged alternately, and the highest point of the rollers of the sorting module 7 and the highest point of the rollers of the adjacent conveying mechanism 8 are located in the same horizontal plane, or form an upward or downward step that does not affect the sorting and transportation of objects. The conveying direction of the conveying mechanism 8 is substantially the same with the main conveying direction or non-conveying direction of the sorting module 7.

On the primary transportation channel 2, the sorting module 7 may not only provided at the sorting outlet or inlet 3, it can also be provided at other positions of the transportation channel. It can be provided at the outlet or inlet 92 of the transportation channel, or provided upstream of the sorting outlet or inlet 3, which plays the role of pre-sorting, diversion or making arrangement, and the width of the sorting module 7 is not necessarily the same as the width of the primary transportation channel 2. The sorting module 7 and the conveying mechanism 8 may be arranged alternately on the primary transportation channel 2, or one part can be the sorting module 7 and the other part is the conveying mechanism 8 so that the moving directions of the object can be more flexible, and moving speed can be more controllable. When a change of the direction of the object is not required, the object can move quickly to the next sorting module 7. The channel at the transportation channel outlet and inlet 92 may be widened, and a plurality of sorting modules 7 may be provided at the transportation channel outlet. The sorting module 7 works and drives the objects to change their moving directions, enabling multiple objects to be arranged side by side and moved together to a place for packing or stacking, thereby improving the packing efficiency. A plurality of sorting modules 7 may be provided at the transportation channel inlet 92, and objects may be placed on the sorting module 7 simultaneously by devices or workers. The sorting modules 7 work and drive the objects to change their moving directions, and the objects will be moved to the transportation channel for sorting. The widened channel at the transportation channel inlet is shown in FIG. 1. One or more sorting modules may also be provided at other positions of the transportation channel. The sorting modules drive the objects to change their moving directions, enabling the objects to move together in multiple rows or multiple columns, thereby utilizing the area of the transportation channel efficiently and increasing the transportation channel's ability of accommodating objects.

Figure 7:
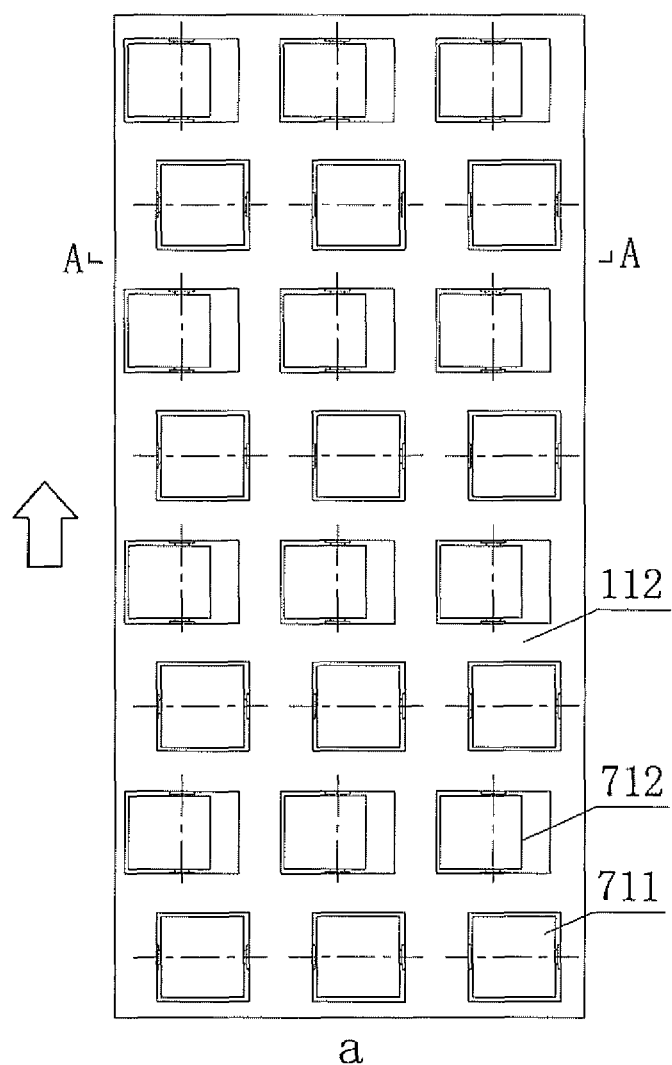
Figure 7:
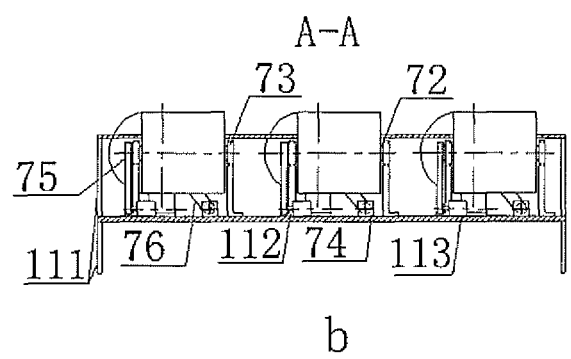

The secondary transportation channel may include a first-level secondary transportation channel 21, a second-level secondary transportation channel 22, and an $N^{th}$—level secondary transportation channel 2N, where N is greater than 2. The secondary transportation channel is connected to the primary transportation channel 2 through a sorting outlet or inlet 3. The thus connected primary transportation channel 2 and the secondary transportation channel are not parallel to each other, but vertical to each other or form an angle than a straight angle, as shown in FIG. 7. The primary transportation channel 2 is connected with the first-level secondary transportation channel 21 to form an object transportation channel, and the objects enter from the primary transportation channel inlet and move along the primary transportation channel 2. The objects that have been sorted out enter the first-level secondary transportation channel 21 through the sorting outlet or inlet 3, and the remaining objects continue to move along the primary transportation channel to the next sorting module 7 or the primary sorting channel outlet, and the objects that have been sorted out can enter the second-level transportation channel 22 through the sorting outlet or inlet 3, or are moved to the outlet of the secondary transportation channel.

When the first-level secondary transportation channel 21 exists, only conveying mechanism 8 can be provided thereon. There is at least one conveying mechanism 8, which drives the objects to the outlet of the first-level secondary transportation channel 21 to complete the transportation process. The length and width of the transportation channel 8 may be decided according to the needs of a manufacturing factory or an express sorting center.

When the first-level secondary transportation channel 21 exists, only sorting module 7 can be provided thereon. There is at least one sorting module 7, which is used to change the moving direction of the objects so that the objects can make a turn or the objects can be arranged more regularly, thereby increasing the capacity of accommodating objects of the transportation channel and facilitating packing and stacking of the objects.

When the first-level secondary transportation channel 21 exists, sorting module 7 and conveying mechanism 8 can be provided thereon. There are at least one sorting module 7 and at least one conveying mechanism 8. The conveying mechanism 8 and the sorting module 7 may be arranged alternately. The conveying mechanism 8 is used to drive the objects to move along the transportation channel, and the sorting module 7 is used to change the moving direction of the objects so that the objects can make a turn or the objects can be arranged more regularly, thereby increasing the capacity of accommodating objects of the transportation channel and facilitating packing and stacking of the objects.

When multi-level secondary transportation channels exist, the first-level secondary transportation channel 21 is provided with at least one sorting module 7 and at least one conveying mechanism 8. The sorting module 7 drives the objects to move toward the sorting outlet or inlet 3 to complete the sorting process, and the objects that need not to be sorted will flow to the next sorting outlet or inlet 3 or the outlet of the transportation channel by the conveying mechanism 8.

In sorting, from the primary transportation channel 2, the objects enter the first-level secondary transportation channel 21 through the sorting outlet or inlet 3. In order to ensure smoothness of sorting, the highest point of the main driving rollers of sorting module 7 of the primary transportation channel at the sorting outlet or inlet 3 is higher than the highest point of the rollers of the conveying mechanism or the main driving rollers of the sorting module 7 of the first-level secondary transportation channel 21. In order to ensure safety of the objects in operation, the height difference therebetween should not be too big. The connection state of the first-level secondary transportation channel 21 and the second-level secondary transportation channel 22 is also like this, that is, the highest point of the rollers of the conveying mechanism of the transportation channel or the main driving rollers of the sorting module 7 of a lower level transportation channel should be lower than, or flush with the highest point of the main driving rollers of the sorting module 7 of the higher level transportation channel.

The conveying device can also be provided with multiple primary transportation channels 2, that is, multiple inlets 92 of objects are present. Objects can enter the conveying device through the multiple inlets 92, and through sorting modules 7, multiple primary transportation channels 2 can be used to gather the objects into the first-level secondary transportation channel 21, followed by the objects being sorted respectively by the sorting modules 7, or not gather the objects into the same first-level secondary transportation channel 21. The primary transportation channels 2 each have its own secondary transportation channels, and the secondary transportation channels of the primary transportation channels 2 can be communicated with one another, and the communicated transportation channels can finally go to one sorting outlet or inlet 3.

The conveying device may further include a plurality of work stations, and at a work station, a work table 41 or a collecting box 42 can be provided. The collecting box 42 may be provided at one side or one end of the transportation channel, and when the sorting is completed or an error is reported, the objects can be transported to the work station that is provided with a collecting box. The requirements of a work station can be defined and set according to the working conditions. The operation table 41 may be provided at one side or one end of the transportation channel, and each operation table may be staffed with workers or equipped with robot arms, and the workers or robot arms can carry out respective assembling, detecting or disassembling, among others, on the work table. The transportation channel may include various objects (one kind of objects for one or more work tables), which can be artificially recognized and artificially caught, or artificially recognized and caught by robot arms, or recognized by mechanical visual recognition and caught by robot arms, among other means. A catching signal may be emitted to the robot arm by pressing a button or voicing, among other means, and based on the received signal, the robot arm can catch the target object from the various objects, and carry out a catching operation. Alternatively, a sorting module 7 may be provided at the work table, and the sorting module 7 is on the transportation route. The position, length and width of the sorting module 7 can be determined according to the size of the work table and the size of the objects to be transported. The irregular rollers 712 of the sorting module 7 should be provided on an edge of the work table 41, and the irregular rollers of the sorting module 7 should be close to the work table 41 as possible as it can be. The rotation center line of the irregular rollers should be near the upper plate to make sure that the irregular rollers extend above the plate a sufficient height so that the objects can be driven to the work table. When objects are needed, a worker can press a button by hand or foot to drive the sorting module, and the objects will change their moving direction when passing through the sorting module 7 and move to the work table, or a robot arm can perform a visual recognition on the work table, and then the sorting module 7 is driven to work when target objects are required. The signal received by the robot arm can be obtained from the result of detection of the work table by the sensors on the robot arm, or the timing of catching can be set by a program, and the catching is performed on time. When the robotic arm performs a catching action according to a catching signal, the target object can be recognized and confirmed according to the signal released by the object, GPS positioning or appearance of the object. The signal released by the object can be weight, and a weighing module can be provided on the transportation channel, and by weight analysis, it can be determined whether the object is a target object or not. The signal released by the object can also be a manually set button. An additional module can be provided on the object to record the process being performed or the process to which the object belongs, and the target object can be determined by detecting the sequence number of the process. When the required work is completed on the work table, the object can be placed back to the former transportation channel, which can be carried out manually or automatically (by pressing a button or voicing), or the object can be placed on another transportation channel. The two transportation channels are connected by a work table therebetween, which can be a table-like platform or a conveying belt.

The conveying device may further include a conveyor belt 5 or a chain plate. The conveyor belt 5 is provided on the transportation channel. It can be arranged with the sorting module 7 and the conveying mechanism 8 in line or in an alternate manner. The structure of the conveyor belt is simple, and the conveyor belt can be in full contact with the bottom surface of an object so that the object can be transported stably. A conveyor belt is more suitable for a long transportation channel where a sorting module 7 is not required.

There may also be a recognition system for sorting on the conveying device. As shown in FIG. 1, the recognition system may be a QR code recognition system or a barcode recognition system. Information about an object, such as product type, weight, address, among others, can be stored in a barcode or a QR code, which can be affixed to any position of the object. The recognition system can be a scanning gun. The recognition system can be equipped with a scanning device. The scanning gun can be fixed on the frame, or it can be fixed above the object by a support, or fixed at one side of the object, or at the bottom of the frame where the QR code or barcode on the bottom of the object is recognized through the gap between the rollers of the transportation channel or sorting system. When the QR code is located at the front or rear side of the object, the scanning gun cannot be provided in front or rear of the object, because this arrangement will become an obstacle to the transportation of the object. Therefore, when the QR code is located at the front or rear side of the object, a flip system may be provided behind the recognition system. The flip system may include a flip channel 61 and a flip plate 62. One end of the flip channel is provided behind the recognition system, and the other end is provided in front of the recognition system. The object that cannot be recognized by the recognition system can be moved to the flip channel through the sorting module, and then moved to the flip plate. The flip plate is perpendicular to the transportation surface and forms an angle with one side of the flip channel. When the object is moved to the flip plate, it cannot pass through.

The object will collide with the flip plate, and the flip plate will drive the object to rotate for a certain angle. The object passes through the sorting module of the flip channel and is moved to the transportation channel. The recognition device will re-sort the object. Due to the flip for a certain angle, the original front or rear end of the object become a side of the object, and the scanning device at that side will be able to scan the QR code. The recognition system may include a scanning module, a control module, a communication module, and a server. The QR code recognition system may include a scanning gun, which can scan the QR code of an object and generate identity data, and the identity data generated by the identification module are processed by the control module and sent to the communication module. The communication module transmits the identity data to the server. The server compares the identity data with the data in the user identity database and obtains identification data. The server transmits the identification data to the communication module, and the identification data received by the communication module is processed by the control module and action data will be sent to the motor of the driving unit, so that the motor drives the sorting module 7 or the conveying mechanism to move and complete the sorting process. The recognition system and recognition process are not limited to the above, as long as the product can be identified. The recognition system 6 can also use a Radio Frequency Identification Technology (RFID). The recognition system may include an electronic tag card, an electronic tag writer, an electronic tag reader and a central system. Each object can be provided with an electronic tag card, and the information of the object can be written into the electronic tag card by the electronic tag writer. The electronic tag reader is provided on the transportation channel to read the information of the electronic tag and upload it to the central system. The information can be processed by the central system, and the drive control module will respond to handle the object. The electronic tag card can be put in a special card bag, which can be attached to the object. The electronic tag card can be reused.

A work table may also be provided respectively at the outlet or inlet 92 of the transportation channel of the conveying device. The objects to be sorted can be placed on a work table 94 at the inlet, and then pushed manually or by another mechanism to the transportation channel. A row of objects that have been sorted out will be transported to the work table at the outlet through the transportation channel or another mechanism, and then packed or stacked.

The conveying device may also include a slide-way. The slide-way is located at the sorting outlet or inlet 3 or the inlet or outlet 92 of the transportation channel, and the slide-way is connected with the transportation channel and the work tables at the outlet or inlet 92 of the transportation channel, respectively. The objects can slide from the work table 94 at the inlet to the conveying device through the slide-way. When the object slides down from a higher place, an initial speed can be imparted to the object to move the object on the transportation channel. When multiple objects slide down in order, a forward driving force can be given by the object that slides down later to the object that slides down earlier, thereby driving the object to move on the transportation channel, so as to prevent congestion of the objects from happening during the conveying process. The objects can also slide from the transportation channel to the work table at the outlet for stacking or packing. Object sliding down from a higher place can impart the object an accelerated speed, driving the object to accelerate and move to the work table, thereby effectively shortening the moving time and improving efficiency. When multiple objects slide down in order, a forward driving force can be given by the object that slides down later to the object that slides down earlier, thereby driving the object to accelerate and move to the work table.

The transportation channel of the conveying device may be a straight channel or a ring channel, and the transportation channel may be horizontal or inclined. When it is an inclined channel, rollers or balls are used to form the channel. If the slope of the inclined channel from a high place to a low place is big, the transportation speed of objects will be too high, and some unpowered rollers with high friction (such as rubber rollers) or short flat roads with high friction can be included. The shape and size of the transportation channel are not limited as above, as long as the sorting and transportation can be achieved.

The conveying device may also include an AGV. A sorting module may be provided on the AGV. The AGV may move to one side or one end of the transportation channel. The objects on the transportation channel move to the sorting module of the AGV. The AGV drives the sorting module to move to the other side of the transportation channel or to a side of another device. The sorting module on the AGV can drive the objects to the transportation channel or another device. The sorting module can drive the objects to move in a flexible direction, which greatly reduces the difficulty of adjusting the angle and direction of the AGV, thereby facilitating transportation of the objects.

What is claimed is:

1. A sorting module, comprising: two groups of transportation rollers,
    wherein the two groups of transportation rollers include at least one group of irregular rollers, wherein a cross-section of the irregular roller perpendicular to a rotation center line of the irregular roller is non-circular or eccentric, and the non-circular cross-section is substantially an ellipse, a regular polygon or another shape;
    wherein the other group of transportation rollers are regular rollers or irregular rollers,
    wherein when the irregular rollers rotate, the highest point of a top of each irregular roller is higher than the lowest point of a top of another group of irregular rollers or the top of the regular rollers,
    wherein when the irregular rollers do not rotate, the highest point of the top of the irregular roller is substantially located at the lowest point of the top of the irregular roller during rotation;
    wherein the cross-section of the regular roller perpendicular to a rotation center line of the regular roller is circular, and the rotation center line passes through the center of the cross-section;
    wherein the regular rollers are cylindrical rollers; each group of transportation rollers include at least one row of transportation rollers,
    wherein each row of transportation rollers include at least one transportation roller; the rotation center lines of each row of transportation rollers are on one straight line, and the rotation center lines of the two groups of transportation rollers are not parallel to each other;
    wherein the two groups of transportation rollers are located at an upper end of the sorting module, and roller axles of the two groups of transportation rollers are provided on a frame of the module via a roller axle support system.

2. The sorting module of claim 1, wherein each group of transportation rollers of the sorting module include at least two rows of transportation rollers, and in one group, the rotation center line of ne row of transportation rollers is parallel to a rotation center line of another row of transportation rollers.

3. The sorting module of claim 1, wherein the rotation center lines of the two groups of transportation rollers are perpendicular to each other.

4. The sorting module of claim 1, wherein the sorting module further includes a built-in driving unit, each group of transportation rollers has its own driving unit, and one driving unit drives one or more rows of transportation rollers in one group.

5. The sorting module of claim 1, wherein an external driving unit is used to drive the sorting module, the external driving unit is provided on an external driving unit support and connected with a transmission mechanism of the module via a belt drive, a chain drive, a gear drive, or a friction drive.

6. A conveying device, comprising: a frame, a transportation channel, the sorting module of claim 1, and a conveying mechanism,
wherein the transportation channel is provided on the frame, and at least one sorting module and at least one conveying mechanism are provided on an upper portion of the transportation channel,
wherein a built-in driving unit of the conveying mechanism drives one or more rows of transportation rollers of the conveying mechanism.

7. The conveying device of claim 6, including a group of transportation rollers, roller axles, the transportation rollers are regular rollers or irregular rollers, the transportation rollers are located at the upper portion of the conveying mechanism, and the roller axles of the transportation rollers are provided on a conveying frame via a roller axle support system.

8. The conveying device of claim 6, wherein an external driving unit is used to drive the conveying mechanism, the external driving unit is provided on an external driving unit support and connected with a transmission mechanism of the conveying device via a belt drive, a chain drive, a gear drive, or a friction drive.

9. The conveying device of claim 6, wherein the transportation channel includes a primary transportation channel and a secondary transportation channel, and the secondary transportation channel includes a first-level secondary transportation channel and $N^{th}$-level secondary transportation channel, the primary transportation channel and the first-level secondary transportation channel, the first-level secondary transportation channel and the second-level secondary transportation channel are perpendicular to each other, or on a straight line, or form an angle therebetween, and the angle is not a right angle.

10. The conveying device of claim 6, wherein the conveying device includes a sorting inlet or outlet, the sorting inlet r outlet is located on the transportation channel, the sorting module is provided at the sorting inlet or outlet, or another place of the transportation channel, the length of the sorting module is equal to or greater than the width of the sorting inlet or outlet, the sorting module located in front of the sorting inlet or outlet plays a pre-sorting role, the width of the sorting module is not necessarily equal to the width of the transportation channel, one part is a conveying mechanism and the other part is the sorting module, or the conveying mechanism and the sorting module are arranged in an alternate manner, and the highest point of the sorting module and the highest points of the adjacent rollers of the conveying mechanism are located in the same horizontal plane, or with an upward or a downward step that does not affect the sorting and transportation of objects, the conveying direction of the conveying mechanism is essentially the same as the main driving direction or non-main driving direction of the sorting module.

* * * * *